United States Patent
Joseph

[11] Patent Number: 5,996,507
[45] Date of Patent: Dec. 7, 1999

[54] TRAY DEVICE

[76] Inventor: Darlene C. Joseph, 10101 Forum Park Dr. #2103, Houston, Tex. 77036

[21] Appl. No.: 09/095,979

[22] Filed: Jun. 11, 1998

[51] Int. Cl.⁶ .................................................. B60R 7/04
[52] U.S. Cl. ..................... 108/46; 108/47; 108/157.13; 108/147.2; 108/125; 224/482; 248/188.5; 248/243
[58] Field of Search .................. 108/44, 46, 47, 108/48, 42, 134, 135, 157.13, 157.1, 147.19, 147.2, 149, 152, 116, 121, 125, 127, 129, 131, 132; 224/482, 550, 551, 275; 211/103; 248/411, 412, 188.5, 214, 243; 297/188.21, 188.2, 188.12, 188.06, 188.05

[56] References Cited

U.S. PATENT DOCUMENTS

| | | | |
|---|---|---|---|
| 2,707,140 | 4/1955 | Hagwell | 108/125 X |
| 2,833,608 | 5/1958 | Tobias | 108/44 |
| 2,904,378 | 9/1959 | MacIver | 108/152 X |
| 3,156,510 | 11/1964 | Hindin et al. | 108/125 X |
| 4,491,257 | 1/1985 | Ingles | 297/188.2 X |
| 5,170,719 | 12/1992 | Pestone | 108/134 X |
| 5,294,026 | 3/1994 | McGirt | 224/275 X |
| 5,560,676 | 10/1996 | Griffith et al. | 108/44 X |
| 5,813,354 | 9/1998 | Scott | 108/44 |

*Primary Examiner*—Janet M. Wilkens

[57] ABSTRACT

A tray device for mounting in a vehicle. The tray device includes a tray top and a pair of legs pivotally coupled to the lower surface of the tray top. The legs are positioned adjacent one of the end edges of the tray top. A mounting member is coupled to another of the end edges of the tray top. The mounting member has a pair of spaced apart elongate arm portions and a cross portion extending between the arm portions of the mounting member. Each of the arm portions has a hooked upper end which is adapted for insertion into a slot of a door of a vehicle between a window of the door and an inner door panel of the door such that the mounting member is positioned adjacent the inner door panel of the door.

10 Claims, 3 Drawing Sheets

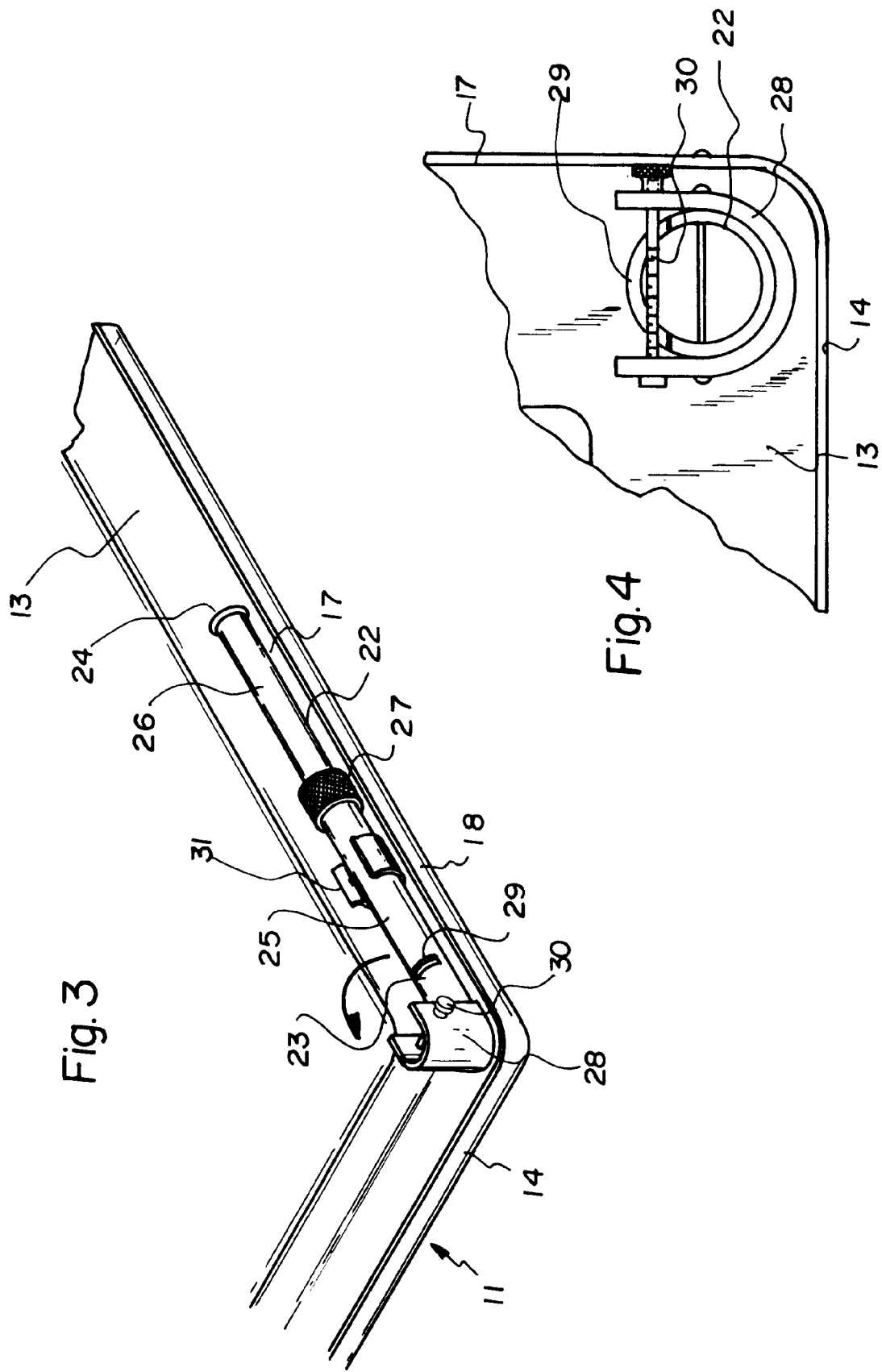

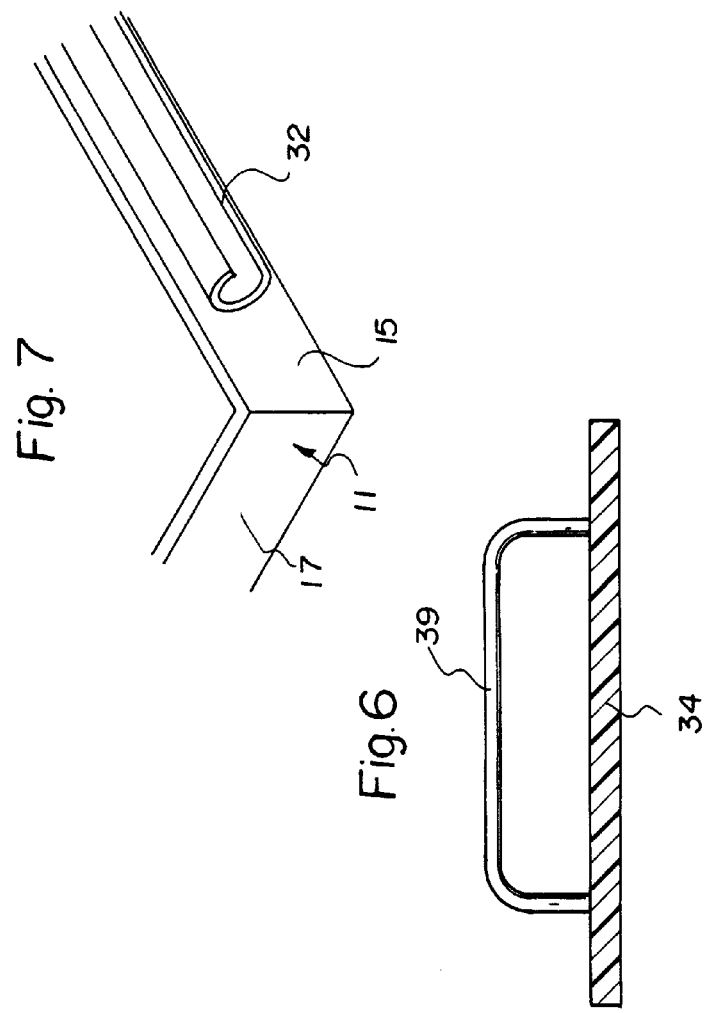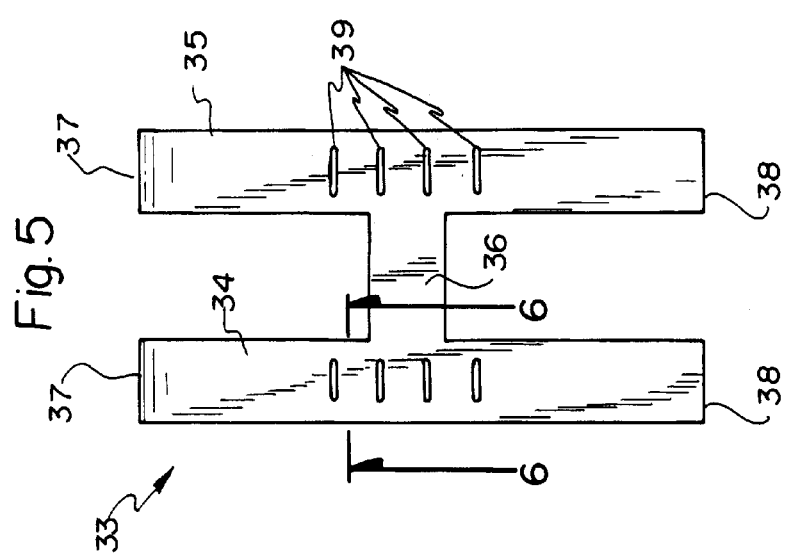

TRAY DEVICE

BACKGROUND OF THE INVENTION

1. Field of the Invention

The present invention relates to trays for mounting in a vehicle and more particularly pertains to a new tray device for mounting in a vehicle.

2. Description of the Prior Art

The use of trays for mounting in a vehicle is known in the prior art. More specifically, trays for mounting in a vehicle heretofore devised and utilized are known to consist basically of familiar, expected and obvious structural configurations, notwithstanding the myriad of designs encompassed by the crowded prior art which have been developed for the fulfillment of countless objectives and requirements.

Known prior art trays for mounting in a vehicle include U.S. Pat. No. 5,427,292; U.S. Pat. No. 5,106,003; U.S. Pat. No. 5,337,677; U.S. Pat. No. 5,413,035; U.S. Pat. No. Des. 344,625; and U.S. Pat. No. Des. 360,183.

While these devices fulfill their respective, particular objectives and requirements, the aforementioned patents do not disclose a new tray device. The inventive device includes a tray top and a pair of legs pivotally coupled to the lower surface of the tray top. The legs are positioned adjacent one of the end edges of the tray top. A mounting member is coupled to another of the end edges of the tray top. The mounting member has a pair of spaced apart elongate arm portions and a cross portion extending between the arm portions of the mounting member. Each of the arm portions has a hooked upper end which is adapted for insertion into a slot of a door of a vehicle between a window of the door and an inner door panel of the door such that the mounting member is positioned adjacent the inner door panel of the door.

In these respects, the tray device according to the present invention substantially departs from the conventional concepts and designs of the prior art, and in so doing provides an apparatus primarily developed for the purpose of mounting in a vehicle.

SUMMARY OF THE INVENTION

In view of the foregoing disadvantages inherent in the known types of trays for mounting in a vehicle now present in the prior art, the present invention provides a new tray device construction wherein the same can be utilized for mounting in a vehicle.

The general purpose of the present invention, which will be described subsequently in greater detail, is to provide a new tray device apparatus and method which has many of the advantages of the trays for mounting in a vehicle mentioned heretofore and many novel features that result in a new tray device which is not anticipated, rendered obvious, suggested, or even implied by any of the prior art trays for mounting in a vehicle, either alone or in any combination thereof.

To attain this, the present invention generally comprises a tray top and a pair of legs pivotally coupled to the lower surface of the tray top. The legs are positioned adjacent one of the end edges of the tray top. A mounting member is coupled to another of the end edges of the tray top. The mounting member has a pair of spaced apart elongate arm portions and a cross portion extending between the arm portions of the mounting member. Each of the arm portions has a hooked upper end which is adapted for insertion into a slot of a door of a vehicle between a window of the door and an inner door panel of the door such that the mounting member is positioned adjacent the inner door panel of the door.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tray device apparatus and method which has many of the advantages of the trays for mounting in a vehicle mentioned heretofore and many novel features that result in a new tray device which is not anticipated, rendered obvious, suggested, or even implied by any of the prior art trays for mounting in a vehicle, either alone or in any combination thereof.

It is another object of the present invention to provide a new tray device which may be easily and efficiently manufactured and marketed.

It is a further object of the present invention to provide a new tray device which is of a durable and reliable construction.

An even further object of the present invention is to provide a new tray device which is susceptible of a low cost of manufacture with regard to both materials and labor, and which accordingly is then susceptible of low prices of sale to the consuming public, thereby making such tray device economically available to the buying public.

Still yet another object of the present invention is to provide a new tray device which provides in the apparatuses and methods of the prior art some of the advantages thereof, while simultaneously overcoming some of the disadvantages normally associated therewith.

Still another object of the present invention is to provide a new tray device for mounting in a vehicle.

Yet another object of the present invention is to provide a new tray device which includes a tray top and a pair of legs pivotally coupled to the lower surface of the tray top. The legs are positioned adjacent one of the end edges of the tray top. A mounting member is coupled to another of the end edges of the tray top. The mounting member has a pair of spaced apart elongate arm portions and a cross portion extending between the arm portions of the mounting member. Each of the arm portions has a hooked upper end which is adapted for insertion into a slot of a door of a vehicle between a window of the door and an inner door panel of the door such that the mounting member is positioned adjacent the inner door panel of the door.

Still yet another object of the present invention is to provide a new tray device that is mountable to a door of a vehicle. In particular between the window and the inside door panel.

Even still another object of the present invention is to provide a new tray device that may be used to rest items such as food and work supplies (such as laptop computers) on so that a user may eat or work comfortably while sitting in the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic perspective view of the lower surface of the present invention with a leg in the folded position.

FIG. 4 is a schematic partial side view of a leg of the present invention in the deployed position.

FIG. 5 is a schematic side view of the mounting member of the present invention.

FIG. 6 is a schematic sectional view of an attachment rung of the present invention taken from line 6—6 on FIG. 5.

FIG. 7 is a schematic perspective view of an attachment clip of the present invention.

DESCRIPTION OF THE PREFERRED EMBODIMENT

Figure 1:
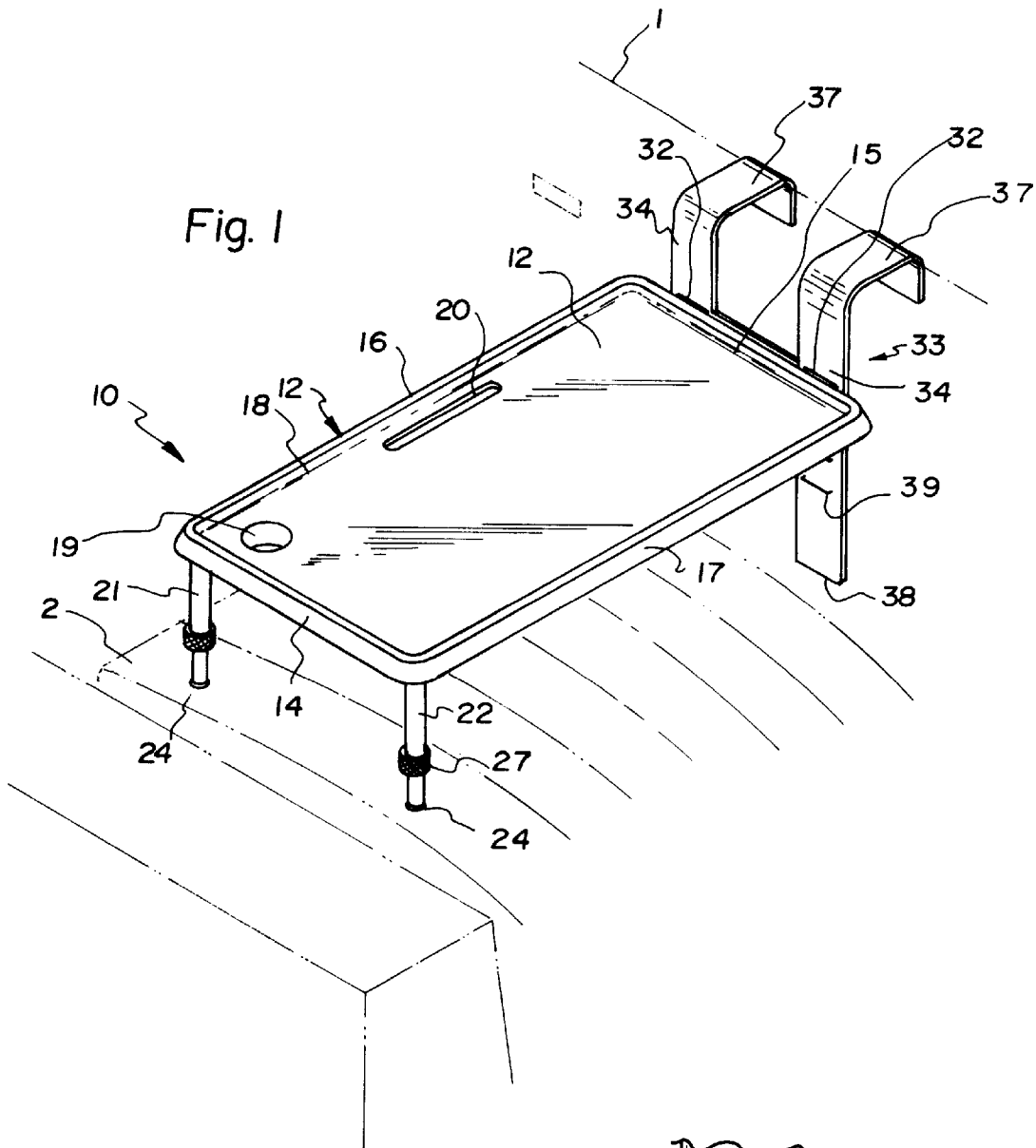
FIG. 1 is a schematic perspective view of a new tray device in use according to the present invention with the legs in the deployed position.

With reference now to the drawings, and in particular to FIGS. 1 through 7 thereof, a new tray device embodying the principles and concepts of the present invention and generally designated by the reference numeral 10 will be described.

In use, the tray device 10 is designed for mounting to a door 1 of a vehicle. The door 1 has an inner door panel and a window slidably mounted in a slot in the door 1. As best illustrated in FIGS. 1 through 7, the tray device 10 generally comprises a tray top 11 and a pair of legs 21,22 pivotally coupled to the lower surface 13 of the tray top 11. The legs 21,22 are positioned adjacent one of the end edges 14 of the tray top 11. A mounting member 33 is coupled to the other end edge 15 of the tray top 11. The mounting member 33 has a pair of spaced apart elongate arm portions 34,35 and a cross portion 36 extending between the arm portions 34,35 of the mounting member 33. Each of the arm portions 34,35 has a hooked upper end 37 which is adapted for insertion into a slot of a door 1 of a vehicle between a window of the door 1 and an inner door panel of the door 1 such that the mounting member 33 is positioned adjacent the inner door panel of the door 1.

In closer detail, the tray top 11 is designed for resting items thereon. The tray top 11 is generally rectangular and has substantially planar upper and lower surfaces 12, 13, a pair of end edges 14,15 and a pair of side edges 16,17 extending between the end edges 14,15 of the tray top 11. The end and side edges 16,17 of the tray top 11 define an outer perimeter of the tray top 11. The tray top 11 has a plurality of corners with a corner of the tray top 11 being formed at each intersection of an end edge and a side edge of the tray top 11. The tray top 11 has a length defined between the end edges 14,15 of the tray top 11. Preferably, the length of the tray top 11 is greater than about 12 inches. Ideally, the length of the tray top 11 is about 16 inches. The tray top 11 has a width defined between the side edges 16,17 of the tray top 11. Preferably, the tray top 11 is greater than about three-fourths the length of the tray top 11. Even more preferably, the width of the tray top 11 is greater than about 8 inches. Ideally, the width of the tray top 11 is about 12 inches.

The tray top 11 preferably has a perimeter lip 18 upwardly extending from the upper surface 12 of the tray top 11 around the outer perimeter of the tray top 11. The lip helps keeps items on the upper surface of the tray top, especially when the vehicle is moving. The tray top 11 has a thickness between the upper and lower surfaces 12, 13 of the tray top 11. The perimeter lip 18 of the tray top 11 has a height extending upwards from the upper surface 12 the tray top 11. Preferably, the height of the perimeter lip 18 of the tray top 11 is about equal to the thickness of the tray top 11. Ideally, the sum of the height of the perimeter lip 18 and the thickness of the tray top 11 is about 1 inch. The upper surface 12 of the tray top 11 also preferably has a generally circular depression 19. The circular depression 19 is designed for holding a beverage container therein. The circular depression 19 is preferably positioned adjacent one of the corners of the tray top 11. Even more preferably, the upper surface 12 of the tray top 11 further includes a generally oblong depression 20. The oblong depression 20 is designed for holding writing instruments therein. The oblong depression 20 is preferably positioned adjacent one of the side edges 16,17 of the tray top 11.

Figure 2:
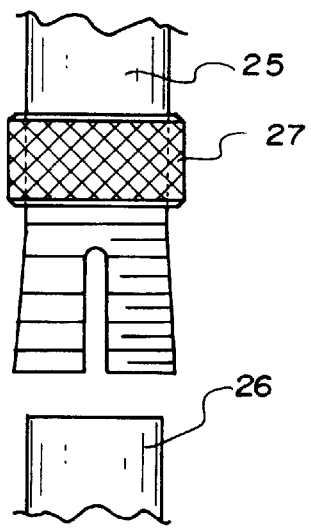
FIG. 2 is a schematic partial side view of a collet ring holding device of a leg of the present invention.

The tray device 10 also includes a pair of telescopically extendable legs 21,22 designed for helping support the tray top 11 above a surface such as a seat 2 or floor of a vehicle. Each of the legs 21,22 is generally cylindrical and tubular and has top and bottom ends 23,24, and top and bottom portions 25,26. The top portion 25 of each leg is positioned adjacent the top end 23 of the associated leg. The bottom portion 26 of each leg is positioned adjacent the bottom end 24 of the associated leg. The bottom portion 26 of each of leg is telescopically inserted into the top portion 25 of the associated leg. Ideally, as illustrated in FIG. 2, the top portion 25 of each leg has a collet ring holding device 27 for holding the bottom portion 26 of the associated leg in a position with respect to the top portion 25 of the leg.

With reference to FIGS. 3 and 4, the top end 23 of each of the legs 21,22 is pivotally coupled to the lower surface 13 of the tray top 11. The top ends 23 of the legs 21,22 are positioned adjacent one of the end edges 14 of the tray top 11 with the top end of one of the legs located adjacent one of the corners of the tray top adjacent the one end edge of the tray top and the top end of another of the legs located adjacent another of the corners of the tray top adjacent the one end edge of the tray top. Preferably, the lower surface 13 of the tray top 11 has a pair of generally U-shaped mounting brackets 28. The top end of the one leg is pivotally coupled to one of the mounting brackets and the top end of the other leg pivotally coupled to another of the mounting brackets.

Each of the legs 21,22 is pivotable between a deployed position (FIG. 1) and a folded position (FIG. 3). The length of each leg is defined between the top and bottom ends 23,24 of the leg. In the deployed position, the length of the leg is generally perpendicular to the plane of the lower surface 13 of the tray top 11. In the folded position, the length of the leg is generally parallel to the plane of the lower surface 13 of the tray top 11. Ideally, as illustrated in FIG. 3, each of the legs 21,22 has a slot 29 therein that is positioned towards the top end 23 of the leg with the length of the slot extending generally perpendicular to the length of the leg. Each of the mounting brackets 28 has a holding pin 30 extending across the arms of the mounting bracket. As illustrated in FIG. 4, the slot 29 of each leg receives the holding pin 30 of the associated mounting bracket when the leg is in the deployed position to releasably hold the leg in the deployed position. In this ideal embodiment, the lower surface 13 of the tray top 11 also has a pair of holding clips 31 coupled thereto. One of the holding clips is positioned adjacent one of the side edges 16 of the tray top 11 and another of the holding clips is positioned adjacent another side edge 17 of the tray top 11. In use, each of the holding clips 31 releasably holds an associated leg to the lower surface 13 of the tray top 11 when the leg is in the folded position.

With reference to FIG. 5, the tray device further includes a mounting member 33 attached to the other end edge of the tray top. The mounting member 33 is generally H-shaped and has a pair of spaced apart elongate arm portions 34,35 and a cross portion 36 extending between the arm portions 34,35 of the mounting member 33. Each of the arm portions 34,35 has a generally U-shaped hooked upper end 37 and a lower end 38, and, preferably, a plurality of spaced apart attachment rungs 39 extending therefrom. The attachment rungs 39 of each of the arm portions 34,35 are arranged in a row extending between the upper and lower ends 37,38 of the arm portions. Preferably, the other end edge 15 of the tray top 11 has a pair of spaced attachment clips 32 each having a generally C-shaped cross section defining an attachment space in each attachment clip. An attachment rung of each arm portion is removably insertable into the attachment clips 32 of the tray top 11 to attach the mounting member 33 to the another end edge of the tray top 11. The attachment rungs 39 thereby permit adjustment of the height of the mounting member 33 extending upwards from the tray top 11. In use, the hooked upper ends 37 of the arm portions 34,35 of the mounting member 33 are adapted for insertion into a slot of a door 1 of a vehicle between a window of the door 1 and an inner door panel of the door 1 such that the mounting member 33 is positioned adjacent and resting against the inner door panel of the door 1. As illustrated in FIG. 1, the bottom ends 24 of the legs 21,22 are restable on a seat 2 (or on the floor) of the vehicle when the legs 21,22 are in the deployed position and the mounting member 33 is mounted to the door 1 of the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tray device for mounting to a door of a vehicle, the door having an inside door panel and a window slidably mounted in a slot in the door, said tray device comprising:

a tray top having upper and lower surfaces, a pair of end edges and a pair of side edges extending between said end edges of said tray top, said end and side edges of said tray top defining an outer perimeter of said tray top, said tray top having a plurality of corners;

a pair of legs, each of said legs having top and bottom ends;

said top end of each of said legs being pivotally coupled to said lower surface of said tray top, said top ends of said legs being positioned adjacent one of said end edges of said tray top, said top end of one of said legs being located adjacent one of said corners of said tray top adjacent said one end edge of said tray top, said top end of another of said legs being located adjacent another of said corners of said tray top adjacent said one end edge of said tray top;

a mounting member being coupled to another of said end edges of said tray top, said mounting member having a pair of spaced apart elongate arm portions and a cross portion extending between said arm portions of said mounting member;

each of said arm portions having a hooked upper end and a lower end, said hooked upper ends of said arm portions of said mounting member being adapted for insertion into the slot of the door of the vehicle between the window of the door and the inside door panel of the door such that said mounting member is positioned adjacent the inside door panel of the door;

said lower surface of said tray top having a pair of mounting brackets, said top end of said one leg being pivotally coupled to one of said mounting brackets, said top end of said another leg being pivotally coupled to another of said mounting brackets;

each of said legs having a slot therein, said slot being positioned towards said top end of said leg, said slot having a length extending generally perpendicular to said length of said leg; and each of said mounting brackets having a holding pin, said slot of the associated leg receiving said holding pin of said mounting bracket when said leg is in a deployed position to releasably hold said leg in said deployed position.

2. The tray device of claim 1, wherein said tray top has a length defined between said end edges of said tray top, said tray top having a width defined between said side edges of said tray top, said length of said tray top being greater than three-fourths said width of said tray top.

3. The tray device of claim 2, wherein said length of said tray top is greater than 12 inches, and wherein said width of said tray top is greater than 8 inches.

4. The tray device of claim 2, wherein said length of said tray top is about 16 inches, and wherein said width of said tray top is about 12 inches.

5. The tray device of claim 1, wherein said tray top has a perimeter lip upwardly extending from said upper surface of said tray top around said outer perimeter of said tray top.

6. The tray device of claim 5, wherein said tray top has a thickness between said upper and lower surfaces of said tray top, wherein said perimeter lip of said tray top has a height extending upwards from said upper surface of said tray top, wherein said height of said perimeter lip of said tray top is about equal to said thickness of said tray top, and wherein a sum of said height of said perimeter lip and said thickness of said tray top is about 1 inch.

7. The tray device of claim 1, wherein said upper surface of said tray top has a generally circular depression, said circular depression being positioned adjacent one of said corners of said tray top.

8. The tray device of claim 1, wherein said upper surface of said tray top has a generally oblong depression, said oblong depression being positioned adjacent one of said side edges of said tray top.

9. The tray device of claim 1, wherein each of said legs is telescopically extendable and has top and bottom portions, said top portion of each leg being positioned adjacent said top end of the associated leg, said bottom portion of each leg being positioned adjacent said bottom end of the associated leg, said bottom portion of each leg being telescopically inserted into said top portion of the associated leg.

10. A tray device for mounting to a door of a vehicle, the door having an inside door panel and a window slidably mounted in a slot in the door, said tray device comprising:

a tray top being generally rectangular and having substantially planar upper and lower surfaces, a pair of end edges and a pair of side edges extending between said end edges of said tray top, said end and side edges of said tray top defining an outer perimeter of said tray top, said tray top having a plurality of corners;

said tray top having a length defined between said end edges of said tray top, wherein said length of said tray top is about 16 inches;

said tray top having a width defined between said side edges of said tray top, wherein said width of said tray top is about 12 inches;

said tray top having a perimeter lip upwardly extending from said upper surface of said tray top around said outer perimeter of said tray top;

said tray top having a thickness between said upper and lower surfaces of said tray top, said perimeter lip of said tray top having a height extending upwards from said upper surface of said tray top, wherein said height of said perimeter lip of said tray top is about equal to said thickness of said tray top, wherein a sum of said height of said perimeter lip and said thickness of said tray top is about 1 inch;

said upper surface of said tray top having a generally circular depression, said circular depression being positioned adjacent one of said corners of said tray top;

said upper surface of said tray top having a generally oblong depression, said oblong depression being positioned adjacent one of said side edges of said tray top;

a pair of telescopically extendable legs, each of said legs having top and bottom ends, and top and bottom portions;

said top portion of each leg being positioned adjacent said top end of the associated leg, said bottom portion of each leg being positioned adjacent said bottom end of the associated leg, said bottom portion of each leg being telescopically inserted into said top portion of the associated leg;

said top end of each of said legs being pivotally coupled to said lower surface of said tray top, said top ends of said legs being positioned adjacent one of said end edges of said tray top, said top end of one of said legs being located adjacent one of said corners of said tray top adjacent said one end edge of said tray top, said top end of another of said legs being located adjacent another of said corners of said tray top adjacent said one end edge of said tray top;

wherein said lower surface of said tray top has a pair of mounting brackets, said top end of said one leg being pivotally coupled to one of said mounting brackets, wherein said top end of said another leg being pivotally coupled to another of said mounting brackets;

each of said legs being pivotable between a deployed position and a folded position, wherein each of said legs has a length defined between said top and bottom ends of said leg;

said length of each leg being generally perpendicular to said lower surface of said tray top when the respective leg is in said deployed position;

said length of each leg being generally parallel to said lower surface of said tray top when the respective leg is in said folded position;

each of said legs having a slot therein, said slot being positioned towards said top end of said leg, said slot having a length extending generally perpendicular to said length of said leg;

each of said mounting brackets having a holding pin, said slot of the associated leg receiving said holding pin of said mounting bracket when said leg is in said deployed position to releasably hold said leg in said deployed position;

said lower surface of said tray top having a pair of holding clips coupled thereto, one of said holding clips being positioned adjacent one of said side edges of said tray top, another of said holding clips being positioned adjacent another side edge of said tray top, each of said holding clips releasably holding an associated leg to said lower surface of said tray top when said leg is in said folded position;

another of said end edges of said tray top having a pair of spaced attachment clips, each of said attachment clips having a generally C-shaped cross section defining an attachment space in each attachment clip;

a mounting member being generally H-shaped and having a pair of spaced apart elongate arm portions and a cross portion extending between said arm portions of said mounting member;

each of said arm portions having a hooked upper end and a lower end, and a plurality of spaced apart attachment rungs extending therefrom;

said attachment rungs of each of said arm portions being arranged in a row extending between said upper and lower ends of said arm portion, one attachment rung of each arm portion being removably insertable into an associated said attachment clip of said tray top to attach said mounting member to said another end edge of said tray top; and said hooked upper ends of said arm portions of said mounting member being adapted for insertion into the slot of the door of the vehicle between the window of the door and the inside door panel of the door such that said mounting member is positioned adjacent the inside door panel of the door.

* * * * *